Oct. 13, 1942. D. J. BOSIO ET AL Re. 22,203

STARTING GATE

Original Filed Aug. 7, 1939 3 Sheets-Sheet 1

INVENTORS
DON J. BOSIO
HOYT CLAY PUETT

BY J. Edwin Coates
ATTORNEY

Oct. 13, 1942. D. J. BOSIO ET AL Re. 22,203

STARTING GATE

Original Filed Aug. 7, 1939 3 Sheets-Sheet 2

BY

INVENTORS
DON J. BOSIO
HOYT CLAY PUETT
J. Edwin Coates
ATTORNEY

Oct. 13, 1942. D. J. BOSIO ET AL Re. 22,203

STARTING GATE

Original Filed Aug. 7, 1939 3 Sheets-Sheet 3

INVENTORS
DON J. BOSIO
HOYT CLAY PUETT
BY Edwin Coates
ATTORNEY

Reissued Oct. 13, 1942

Re. 22,203

UNITED STATES PATENT OFFICE 22,203

STARTING GATE

Don J. Bosio, Santa Monica, and Hoyt Clay Puett, Beverly Hills, Calif., assignors to Puett Electrical Starting Gate Corporation, Beverly Hills, Calif., a corporation of California Original No. 2,232,675, dated February 18, 1941, Serial No. 288,800, August 7, 1939. Application for reissue February 2, 1942, Serial No. 429,345

16 Claims. (Cl. 119—15.5)

Figure 1:
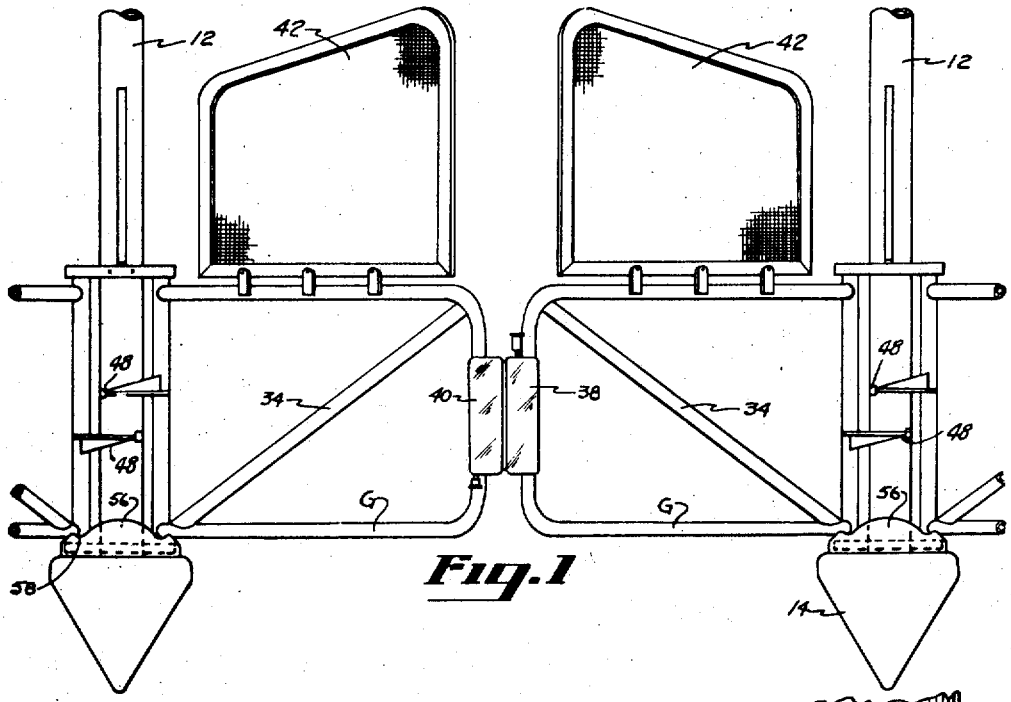

This invention relates to improvements in starting gates which are particularly adapted for starting horse races.

A great deal of difficulty has been experienced in the past in starting such races evenly because of the nervous temperament of the animals. When horses were started in the open they came in contact before the race started and the jockeys could interfere with each other. There was nothing to keep the horses lined up or faced ahead.

Stalls were then used which kept the horses heading in the proper direction but some horses would start out ahead of the signal and would have to be called back. In order to prevent this, various types of releasable barriers were tried. So far as we are aware, none of the starting devices in use previous to our invention has been entirely successful. They have been unreliable or irregular in operation or have allowed horses to start out diagonally, thus interfering with other horses, or have otherwise been the cause of numerous false starts.

It is an object of our invention to provide a starting device which overcomes the objections above stated. It is a further object of our invention to provide a starting device which will prevent horses and jockeys from interfering with each other before the start which will prevent horses from rushing the barrier and which will insure that all the horses start in properly spaced relation and without any tendency to follow a diagonal course.

Other objects are to provide barriers or gates which open rapidly, to provide compact and reliable locks for said barriers or gates and to provide means to release all the locks simultaneously with each other and with the starting signal. Many other objects and advantages of our invention will become apparent as the description proceeds.

The accompanying drawings show our invention in its present preferred embodiment and illustrate the new and improved principles of our construction. While they show a particular form in considerable detail they are not to be construed as limiting the scope of the invention.

Figure 2:
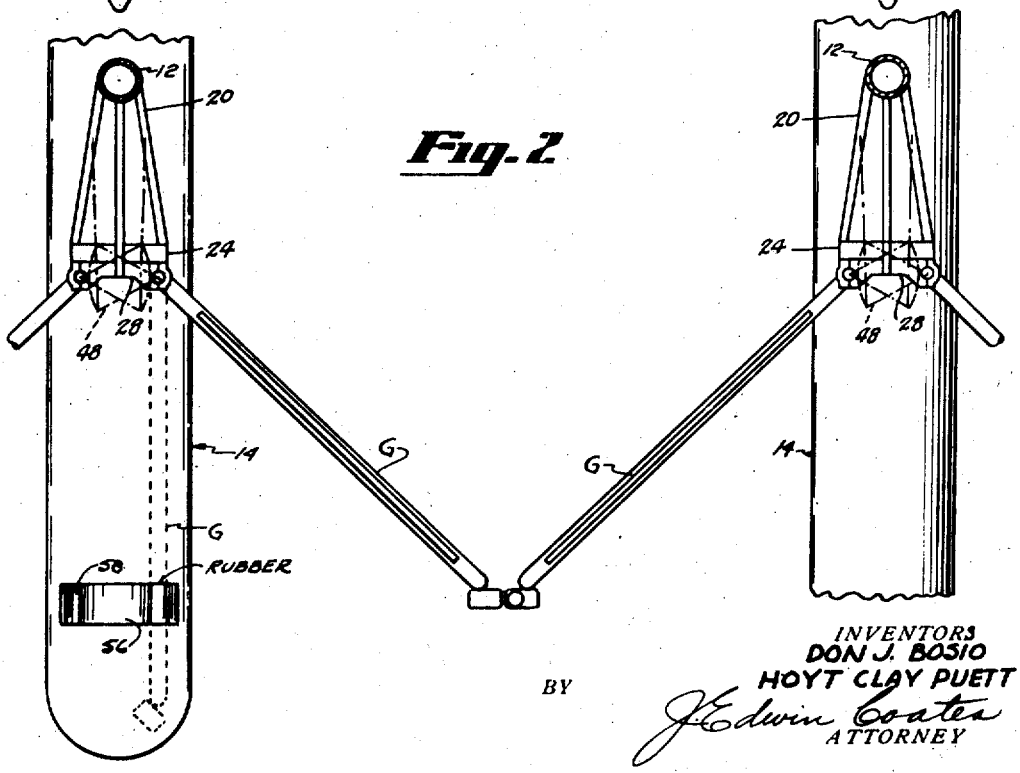
Figure 3:
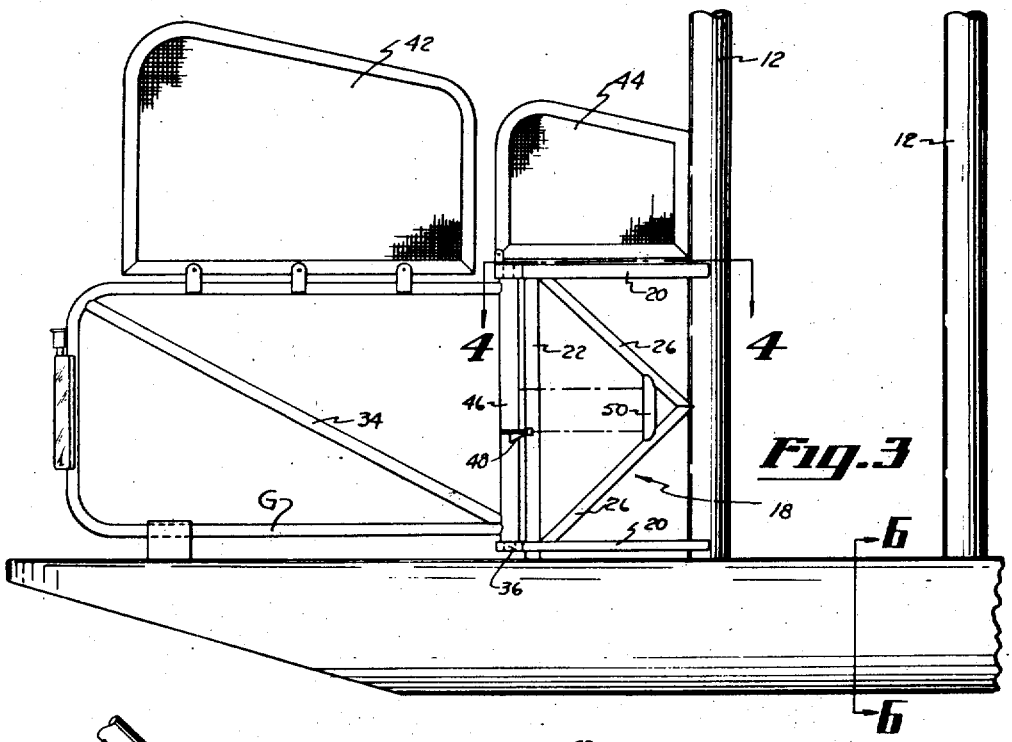
Figure 5:
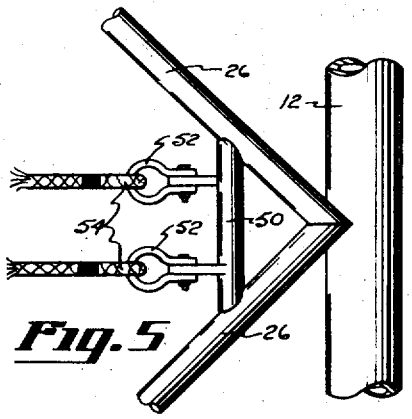
Figure 4:
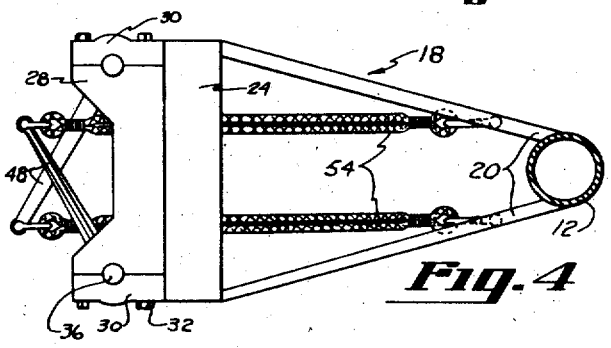
Figure 6:
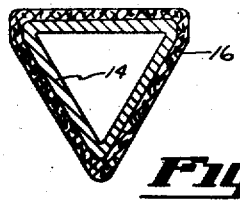
Figure 7:
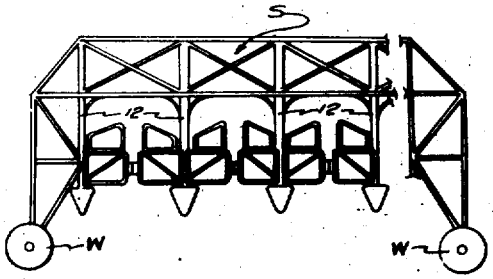
Figure 8:
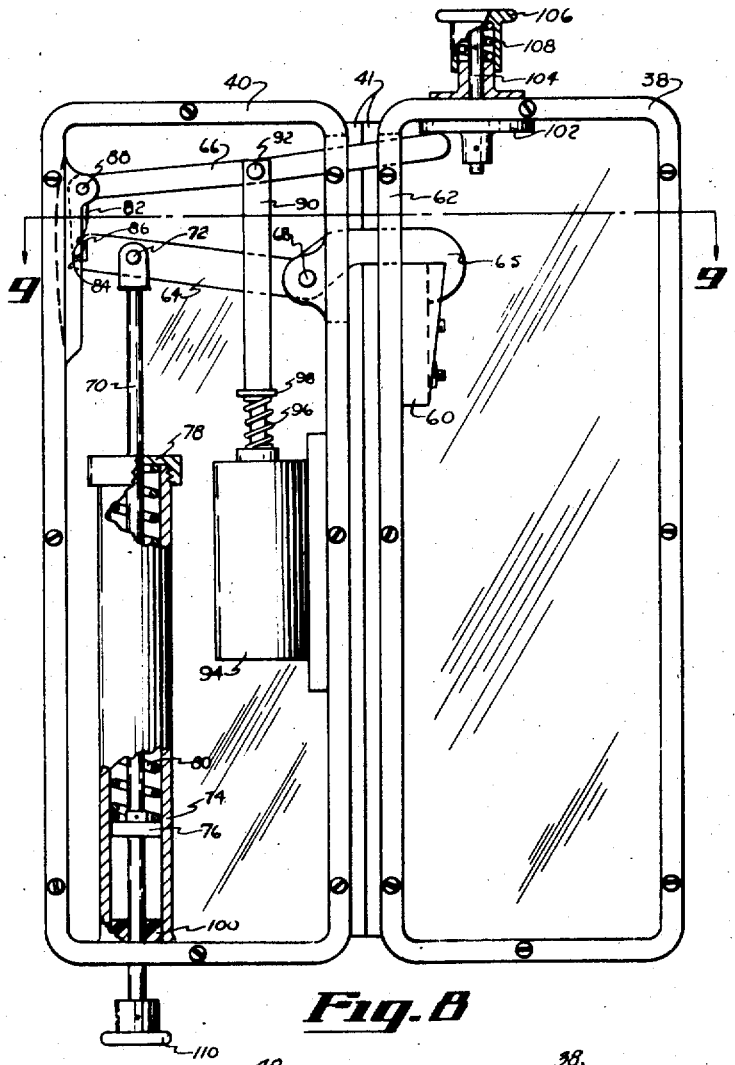
Figure 10:
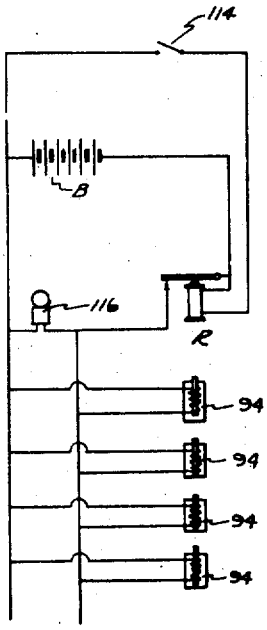
Figure 9:
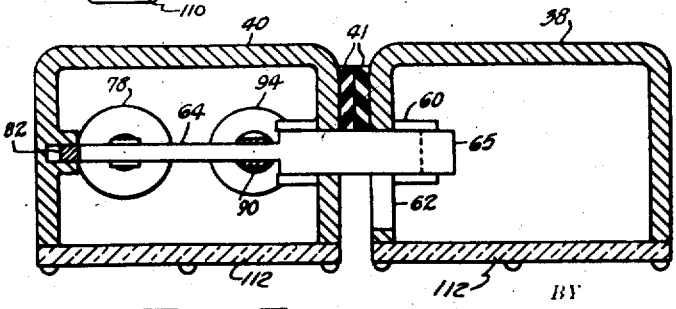

In the drawings:

Fig. 1 is a front elevational view of a portion of the device showing one stall and a pair of starting gates provided with lock means, Fig. 2 is a plan view of the same structure, Fig. 3 is a side elevational view of the structure of Figs. 1 and 2, Fig. 4 is a detailed plan view, partly in section, looking in the direction of arrows 4—4 in Fig. 3, Fig. 5 is an enlarged detail view in side elevation of a part of Fig. 4, Fig. 6 is a sectional view taken on the line 6—6 in Fig. 3, Fig. 7 is a front elevation of a mobile overhead structure carrying a plurality of stall forming partitions, Fig. 8 is a view in elevation, showing the details of the releasable lock mechanism, Fig. 9 is a section taken on line 9—9 of Fig. 8 and, Fig. 10 is a schematic view of the electrical circuit, including switch, relay, signal device and lock releasing means.

The starting device, in its entirety, as shown in Fig. 7, consists of an elongated overhead structure S supported at each end upon wheels or rollers W for facilitating removal from the track after starting a race. Pairs of depending tubular members 12, Fig. 3, are attached to the overhead structure at regular intervals therealong. These members form partitions, dividing the device into a plurality of stalls.

An elongated framework 14 is carried by the lower end of each partition. Each framework extends in the same plane as the partition and at right angles to the length of the overhead structure, thus serving further to define the stall and to provide an extended guide to keep the horse properly headed during the start.

It will be noted that the framework is substantially triangular in cross-section, as shown in Fig. 6, with the base uppermost. The entire framework, as well as a part of the partition, is covered with padding 16 to prevent injury to horse or rider. The widest part of the framework is at about the height of a horse's chest and serves as an effective bumper. The lower part, tapering inwardly, will not interfere with the horse's legs unless he kicks and then it will prevent him from injuring the horse in the next stall. The lower edge of the padded frame is spaced well above the ground and consequently the entire device may be moved on and off the track readily, as desired.

An auxiliary structure, generally designated as 18, is attached to and extends forwardly from the foremost tubular post 12. This structure is made up of horizontal diverging members 20, vertical members 22, crossbars 24 and braces 26. The entire structure is preferably welded together and to post 12 but any other suitable means of connection may be used.

Bearing blocks 28 are attached to crossbars 24 and bearing caps 30 are suitably attached thereto, as by bolts 32, to form therewith bearing members for receiving the hinge pins of the gates.

The gates or obstructions G are substantially rectangular in shape with slightly rounded corners at their free ends and are provided with suitable bracing, such as shown at 34. The rear ends of the gates are straight and have reduced upper and lower extensions 36 serving as hinge pins which fit within the bearings formed by members 28 and 30. They are thus firmly supported by the widely spaced bearings for swinging about a vertical axis with a minimum of play and consequent tendency to rattle. Padding, not shown, may be carried on each gate to prevent any injury to the horse.

An important feature of the invention is the provision of a pair of gates and their angularity in closed position. This is best shown in Fig. 2 in which are illustrated a pair of gates G, G, pivotally carried at their rear ends by the auxiliary structure, their free ends substantially meeting at the center line of the stall. Each gate stands at an angle of substantially 45° to the fore and aft axis of the stall or the framework and partition forming the stall. While the angle is not critical it should be susbtantially less than a right angle with the partition. The 45° angle has been found to produce very satisfactory results in actual use. The gates are held in closed position by releasable lock means 38, 40, which will later be described in detail. When the lock means is released, the gates swing open to a position indicated by dotted lines in the left hand part of Fig. 2.

The success of this device is largely due to the positioning of the gates with respect to the structure and the angularity between the gates themselves. As previously stated, the wide portion of the padded framework is at about the height of the horse's chest. The gates extend approximately two feet above the framework. The foremost portion of the V formed between them is in the center of the stall. Because of the acute angle between them, a horse who pushes forward against the gates will be urged to a central position. The height of the gates is such that the horse will engage them with his nose rather than his chest. Since his nose is quite tender, this arrangement has been found to be highly effective in discouraging horses from rushing the barrier.

The gates swing thru only about 45° from closed to full open position and consequently they can swing out of the way so quickly that even a horse breaking fast will not be hindered or injured by bumping into them. Since they swing symmetrically away from center they form a visual guide tending to start the horse straight.

The framework 14 extends forwardly substantially beyond the forward end of the gate. Consequently each gate swings to an open position within the confines of the framework as shown in the lower left portion of Fig. 2. This leaves a wide open stall, completely padded and extending well forward of the horse's standing position, which starts him straight and keeps him from crowding the next horse before the race is well under way.

As a final measure, screens 42, 44 are mounted above the gate and auxiliary structure to preclude any possibility of horses or riders interfering with each other. These screens are preferably composed of light metal frames and relatively open wire mesh. Thus they are quite effective for their intended purpose but do not interfere with vision to any great extent. Horse and rider will still be aware of everything going on about them. While the screens are shown as separate structures it is obvious that the gates and auxiliary structures may be extended upwardly and screening applied to the upper portions without departing from the spirit or scope of the invention.

The arrangement of the resilient means for urging the gates to open position is best shown in Figs. 4 and 5. The vertical posts 46 forming the rear edge of each gate are provided with rigidly attached levers or bell cranks 48. Anchorage bars 50 are welded to braces 26 and carry clevises 52. Pieces of resilient or elastic cord 54 commonly referred to as "shock-cord," are stretched between the clevises 52 and the free ends of bell cranks 48 with sufficient tension to snap the gates open very suddenly when the locks are released. The bell cranks are so arranged that the leverage of the shock-cords remains substantially the same thruout the swing.

Snubber members 56 are blocks of resilient material, such as rubber, each having a high center portion and downwardly sloping upper surface. When the lower edge of a gate strikes this sloping surface it is effectively slowed down to a stop with practically no noise. Notches or depressions 58 are formed in the sloping surface of each snubber, serving as detents to receive the gate bottoms and prevent them from rebounding.

The use of welded tubular construction thruout makes a very rigid and rugged structure and provides a strong but light weight gate which has little inertia and hence is adapted for rapid opening.

The releasable lock means, shown in detail in Figs. 8 and 9, serves to hold the gates firmly in closed position until released. This is very important since finely trained horses, prepared to run at the sound of a bell, will make false starts whenever loose, rattling gates make metallic clicks.

As shown in Fig. 8, member 38 is a hollow rectangular casing carrying a rigidly mounted keeper 60. The casing is also provided with an opening or passageway 62 of sufficient size to freely receive members 64 and 66. The former is a latch, pivoted at 68 and provided with a head 65 adapted to accurately engage the keeper to hold the lock portions firmly together. The member 40 is a casing similar in form to casing 38. Members 41 are strips of rubber, felt, or other elastic or yieldable material carried by each casing and adapted to be slightly compressed when the casings are locked together.

Rod 70 is pivotally attached to latch 64 at 72 and is slidably engaged in tube 74. The rod carries a piston or shoulder 76. Between this shoulder and the cap 78 threadably attached to the upper end of the tube is a coil spring 80. This spring, which is under considerable compression, constantly tends to force rod 70 downward, consequently urging latch 64 to inoperative position.

Release of the latch is normally prevented by trigger 82, formed as a continuation of lever 66. Meeting faces 84 of the trigger and 86 of the latch are so angularly arranged with respect to pivot 88 that they will disengage only under the influence of external force.

Rod 90 is pivotally attached to lever 66 at 92, its lower end slidably extending into solenoid 94. Spring 96, in compression between the solenoid and shoulder 98, urges rod 90 upward and trigger 82 into locking position. Electric wires, not shown, lead from the solenoid to a source of potential, as diagrammatically shown in Fig. 10. When electric current is passed thru the solenoid it attracts rod 90, pulling it down and disengaging trigger 82 from latch 64. Thereupon spring 80 forces rod 70 downward, swinging latch 64 to inoperative position, thus allowing the gates to swing open under the influence of the resilient means previously described. A resilient member 100, such as a rubber ring, serves as a bumper for collar 76.

The latch may also be released manually by means of disk 102 carried on pin 104. An operating knob 106 urged upwardly by spring 108 is attached to the upper end of pin 104. Pressure on knob 106 will disengage trigger 82 and release latch 64.

To lock the gates, the two casings are first brought together with their flat yieldable faces engaging and slightly compressed. Knob 106 is then pressed down, moving trigger 82 out of the way. Rod 70 is then pushed up by means of knob 110 against the force of spring 80. This brings latch head 65 into locking engagement with keeper 60. While it is held in this position knob 106 is released and trigger face 84 engages latch face 86. The lock is now set and ready for operation.

It will be seen that we have provided a lock which is readily engaged and which may be released manually or electrically at will, neither arrangement interfering with the other. The snug engagement of the lock parts makes a practically rattle proof gate. The entire arrangement is neat, compact and reliable.

In order to permit observation of the condition and operation of the lock mechanism at all times, one wall of each casing may be made of transparent material, as indicated at 112 in Fig. 9.

Fig. 10 shows diagrammatically how a plurality of gates may be operated from a single source of electricity. In this figure each of the solenoids 94 is connected in parallel across the circuit which includes battery B, relay R, and switch 114. A signal 116, generally a bell, is also connected in parallel across the circuit.

In operation switch 114 is closed, sending a current thru the solenoid of relay R. The relay then closes the main circuit and the current from battery B passes thru solenoids 94 and signal 116. This positively insures that all gates will open simultaneously with each other and with the sounding of the starting signal.

There may, in some cases, be as many as sixteen solenoids operating an equal number of gates. Since they each draw a relatively heavy current the total may well be several hundred amperes. The purpose of the relay R is to avoid passing this heavy current thru manually operated switch 114.

An advantage of the parallel type circuit is that any number of gates may be cut out without any rearrangement of the wiring of those which are to be used.

The fluid controlling means, and fluid conductor or similar language in the claims designate electrical means, or hydraulic, or pneumatic means.

In the claims, the term "a magnet having relatively movable parts" or similar terminology designates a magnetic winding and all parts made of magnetic material both fixed and movable, such as the core fixed to the energizing winding and the armature, or in other words the metallic part which is attracted by the core when the latter is electrically energized.

While we have described our invention in detail in its present preferred embodiment, it will be obvious to those skilled in the art, after understanding our invention, that various changes and modifications may be made therein without departing from the spirit or scope thereof. We aim in the appended claims to cover all such changes and modifications.

We claim:

1. In a device of the class described, a pair of support members, a gate pivotally attached to each support member, said gates in closed position extending inwardly and forwardly with their free ends substantially adjacent, each gate making an angle of approximately 45° with the fore and aft axis of said support members, a casing carried by each gate, said casings having faces meeting along a fore and aft plane, a keeper carried by one casing and a latch carried by the other casing and electric and manual means for releasing said latch.

2. In a device of the class described, a pair of gates, a casing carried by each gate, a keeper rigidly mounted in one casing, a latch pivotally mounted in the other casing, resilient means urging said latch to inoperative position, trigger means to hold said latch in locking position, electrical means carried by one casing to release said trigger means and manual means carried by the other casing to release said trigger means.

3. In a starting gate for horses, an overhead support, ground engaging wheels, frame members for connecting said support to said wheels, partitions depending from said support and each terminating at its lower end in a framework forming the lower end of a stall partition, a gate pivotally carried by the forward end of each partition by means of upper and lower spaced pivots, padding carried by said framework, said gates being positioned above said padding, said gates in closed position being in V-shaped formation, the front and rear faces of each gate extending substantially vertical and forming an angle between the rear faces thereof of approximately 90 degrees, locking means associated with the forward free ends of each pair of gates, a lever extending laterally from each gate intermediate of said spaced pivots and adjacent its pivoted end, and elastic means connected to each lever and to a respective partition whereby to cause a quick opening of a pair of gates upon release of said locking means, said locking means comprising a latch carried by one gate, a detent on the other gate positioned to be engaged by said latch, and an electric solenoid carried by said one gate adjacent the free edge of the gate and being operably associated with said latch for releasing same.

4. In a structure used for a barrier on a race track, two or more pairs of obstructions, means mounting said obstructions for arcuate movement from a position in angular relation to each other to a position of substantial parallelism, means controlled by fluid and mounted on an obstruction of each pair for initiating release of that pair of obstructions and locking means engaging the other obstruction of that pair for causing that pair of obstructions to be established in locking relation, said locking means being biased to disengage the other obstruction, said means controlled by fluid being adapted to release the locking means and to allow it to disengage the other obstruction, and means for simultaneously actuating each of said fluid controlled means.

5. A race track starting device comprising a framework, three or more vertical partitions extending therefrom and transverse obstructions extending between pairs of partitions and converging toward each other in a forward direction, means pivoting each obstruction on an adjacent partition, electrical means and vertically moving parts mounted on one of said obstructions of a pair of partitions, said parts being associated with the adjacent obstruction whereby in one position of the obstructions the said electrical means will permit the parts to maintain the obstructions in converging relation and actuation of the electrical means while the obstructions are in that position causes release of said parts, and spring means for causing outwardly swinging movement of the obstructions, and means for simultaneously actuating each of said electrical means.

6. A race track starting device comprising a framework, three or more vertical partitions extending therefrom and transverse obstructions extending between pairs of partitions and converging toward each other in a forward direction, means pivoting each obstruction on an adjacent partition, and fluid controlling means having vertically moving parts mounted on one of said obstructions of a pair of partitions, said fluid controlling means being associated with the adjacent obstruction whereby in one position of the obstructions the said fluid controlling means will permit the parts to maintain the obstructions in converging relation and actuation of the fluid controlling means while the obstructions are in that position causes release of said parts, and spring means for causing outwardly swinging movement of the said obstructions, and means for simultaneously actuating each of said electrical means.

7. A starting gate for race horses having an overhead structure, and a plurality of partitions extending therefrom, pairs of obstructions mounted on adjacent partitions and forming forwardly extending V's when in closed position, a biased holding means on one obstruction of each pair having a member extending to and engaging the other obstruction, and fluid means on one obstruction of each pair including a fluid conductor from a power source for initiating actuation of the holding means to release said obstructions, spring means to move the obstructions to open position, and means for simultaneously actuating each of said holding means.

8. In a starting device for horse racing, comprising an overhead structure, a plurality of partitions depending from said overhead structure defining a stall between each pair of adjacent partitions, and a closure for each stall, said closure comprising a pair of gates, a vertical pivot for each of said gates, said gates when in closed position being in V arrangement with their meeting edges located forwardly of said pivots, electromagnetic means for effecting the operation of said gates, said electromagnetic means including a magnet having relatively movable parts, at least one of said parts being mounted for movement with one of said gates about the vertical pivot thereof, and biasing means for opening said gates when released by said electric means, said V-gates being of sufficient height and width so that the horse pushing forward against the gates will be urged toward a central position, and the nose of said horse rather than its chest may engage said gates.

9. A race device for horse races having horse separating elements, a plurality of pairs of obstructions, each obstruction being pivotally mounted on substantially a vertical axis adjacent a separating element, each pair of obstructions converging forwardly from a pair of said separating elements to form a V when in closed position, said V being of sufficient height and width so that a horse pushing forward against the obstructions will be urged forward to a central position and the nose of said horse rather than its chest may engage said obstructions, means including a magnet having relatively movable parts for holding and releasing each pair of obstructions, at least one of said magnet parts being mounted on the vertical axis of one of said obstructions, spring means for opening said pairs of obstructions when released by said means last named, means maintaining each pair of obstructions in substantially parallel relation to each other when they are in open position, a circuit connected to said magnets and an electric switch in said circuit, each pair of obstructions forming a straightaway for guiding each horse when said obstructions are in open position.

10. A race device for horse races having horse separating elements, a plurality of pairs of obstructions each obstruction being pivotally mounted on substantially a vertical axis adjacent a separating element, an overhead structure, a support for each separating element and one of each adjacent pair of obstructions, each pair of obstructions converging forwardly from a pair of said separating elements to form a V when in closed position, said V being of sufficient height and width so that a horse pushing forward against the obstructions will be urged forward to a central position and the nose of said horse rather than its chest may engage said pair of obstructions, means including a magnet having relatively movable parts for holding and releasing its pair of obstructions, at least one of said magnet parts being mounted on the vertical axis of one of said obstructions, spring means for opening said pairs of obstructions when released by said means last named, means maintaining each pair of obstructions in substantially parallel relation to each other when they are in open position, a circuit connected to said magnets and an electric switch in said circuit and each pair of obstructions forming a straightaway for guiding each horse when said obstructions are in open position.

11. In a starting device for horse racing, comprising an overhead structure, a plurality of partitions depending from said overhead structure defining a stall between each pair of adjacent partitions, and a closure for each stall, said closure comprising a pair of gates, a vertical pivot for each of said gates, said gates when in closed position being in V arrangement with their meeting edges located forwardly of said pivots, electromagnetic means for effecting the operation of said gates, said electromagnetic means including a magnet having relatively movable parts, said magnet being mounted for movement with one of said gates about the vertical pivot thereof, and biasing means for opening said gates when released by said electric means, said V-gates being of sufficient height and width that the horse pushing forward against the gates will be urged toward a central position, and the nose of said horse rather than its chest may engage said gates.

12. A race device for horse races having horse separating elements, a plurality of pairs of obstructions, each obstruction being pivotally mounted on substantially a vertical axis adjacent a separating element, each pair of obstructions converging forwardly from a pair of said separating elements to form a V when in closed position, said V being of sufficient height and width so that a horse pushing forward against the obstructions will be urged forward to a central position and the nose of said horse may engage said obstructions, means including a magnet having relatively movable parts for holding and releasing each pair of obstructions, said magnet being mounted on the vertical axis of one of said obstructions, spring means for opening said pairs of obstructions when released by said means last named, means maintaining each pair of obstructions in substantially parallel relation to each other when they are in open position, a circuit connected to said magnets and an electric switch in said circuit, each pair of obstructions forming a straightaway for guiding each horse when said obstructions are in open position.

13. A race device for horse races having a pair of support members, a gate attached to each support member, said gates in closed position extending inwardly and forwardly with their free ends substantially adjacent, each gate making an angle of approximately 45 degrees with the fore and aft axis of said support members when said gates are in closed position, said gates when in closed position being of sufficient height and width so that a horse pushing forward against said gates will be urged forward to a central position and the nose of said horse rather than its chest may engage said gates a keeper carried by one gate and a latch carried by the other gate, and electric and manual means for releasing said latch.

14. In a device of the class described, a pair of gates, a keeper rigidly mounted on one gate, a latch pivotally mounted on the other gate, resilient means urging said latch to inoperative position, trigger means to hold said latch in locking position, electric means carried by one gate to release said trigger means, and manual means carried by the other gate to release said trigger means.

15. A race device for horse races having a pair of support members, an obstruction pivotally attached to each support member, said obstructions in closed position extending inwardly and forwardly with their free ends substantially adjacent, each obstruction making an angle of approximately 45 degrees with the fore and aft axis of said support members, said obstructions when in closed position being of sufficient height and width so that a horse pushing forward against said obstructions will be urged forward to a central position and the nose of said horse rather than its chest may engage said obstructions, a casing carried by one of said obstructions, a latch carried by said casing, a keeper carried by the other obstruction, and electric and manual means for releasing said latch.

16. In a device of the class described, a pair of gates, a casing carried by one of said gates, a keeper rigidly mounted on the other gate, a latch pivotally mounted in said casing, resilient means urging said latch to inoperative position, trigger means to hold said latch in locked position, electric means carried by said casing to release said trigger means, and manual means carried by the other gate to release said trigger means.

DON J. BOSIO.
HOYT CLAY PUETT.